June 11, 1963  R. W. WHEELER  3,093,527
METHOD FOR TREATING GLASS SHEETS
Filed Nov. 23, 1960

*INVENTOR.*
ROBERT W. WHEELER
BY Oscar H. Spencer
*ATTORNEY*

United States Patent Office 3,093,527
Patented June 11, 1963

3,093,527
METHOD FOR TREATING GLASS SHEETS
Robert W. Wheeler, Cheswick, Pa., assignor to Pittsburgh Plate Glass Company, Pittsburgh, Pa., a corporation of Pennsylvania
Filed Nov. 23, 1960, Ser. No. 71,282
4 Claims. (Cl. 156—99)

This invention relates to a method for treating glass sheets and more especially relates to a method of treating one of two glass sheets which, after bending together as a doublet, are used with a plastic interlayer to form a bonded glass-plastic-glass curved laminate useful as a windshield for a vehicle such as an automobile.

Curved windshields are used in modern vehicles such as automobiles. These windshields comprise two substantially matching curved glass sheets with a plastic interlayer bonded to both glass sheets. The interlayer is customarily a sheet of plasticized thermoplastic material such as plasticized Vinal. The thermoplastic material is bonded to the two glass sheets by the application of heat and pressure. A method of bonding a plasticized thermoplastic sheet to two glass sheets to form the laminated curved windshield is disclosed in U.S. Patent No. 2,948,-645, granted to Laurence A. Keim on August 9, 1960.

Prior to bonding the thermoplastic sheet to the pair of matched curved glass sheets the latter sheets are prepared from flat glass sheets which are bent together as a doublet. The two glass sheets forming the doublet are cut to outline and one of the glass sheets is placed on the other. The doublet is placed on a bending mold which is passed through a bending lehr, whereby the two glass sheets are bent. The two glass sheets are bent in the lehr so that each has a central portion which has a gentle curvature about a transverse axis normal to the longitudinal axis of each of the sheets. In the bending lehr each of the two glass sheets of the doublet is bent sharply between the end portions and the central portion about transverse axes that are normal to the longitudinal axes of the sheets. As a result of the bending operation, the end portions extend from the central portion generally in the same direction and substantially parallel to each other. The radius of curvature at the sharply bent portions of the sheets between the end portions and the central portion of each sheet is of the order of 8 to 12 inches.

Because the two glass sheets of the doublet are bent together and because the bent or curved doublet should have their extremities in substantial matching relationship, it is necessary to use, as the doublet, two glass sheets which are of slightly different length. The shorter flat glass sheet cut to outline is placed on the longer glass sheet which is also cut to outline and this doublet is placed on the bending mold. During the bending operation the shorter glass sheet at its ends moves along the upper surface of the bottom glass sheet of the doublet.

After cutting the two glass sheets to outline for the preparation of a doublet to be bent in the preparation of a laminated curved windshield, it is customary to seam the edges of the top and bottom glass sheets along the central portion of these sheets. As described in section K–2, page 8, of the "Glass Manual" published by Pittsburgh Plate Glass Company and copyrighted in 1946, the term "to seam" is to grind off the edge of the face of a plate of glass at a narrow angle. The two sheets that will form the doublet are seamed on both major faces at the edges of the central portion prior to bending of the doublet in order to avoid cutting the hands of individuals handling the sheets when placing them together to form this doublet and placing the doublet on the bending mold. An example of a glass bending mold is disclosed in U.S. Patent No. 2,924,045, granted to Paul Startzell on February 9, 1960.

After the bending operation on the doublet of glass sheets to produce the pair of matched curved glass sheets, glass chips have been found between the two glass sheets at a substantial distance from the tips of the sheets. These glass chips at the temperature of the bending operation tend to become fused to one or both of the glass sheets forming the doublet. This creates an optical defect which can result in failure of the product to meet the optical requirements for windshields. Furthermore, the presence of such glass chips causes difficulties in the laminating or bonding process when a composite assembly including the two glass sheets and a plastic sheet between them is subjected to an elevated pressure and an elevated temperature in a laminating process such as disclosed in said U.S. Patent No. 2,948,645, which is assigned to the assignee of the present patent application.

It is an object of the present invention to provide a method for treating glass sheets, to be bent with other glass sheets as doublets, in order to eliminate or substantially reduce the amount of glass chips between the glass sheets of doublets during bending of the sheets.

It is another object of this invention to provide an overall process for preparing curved windshields from pairs of glass sheets cut to outline including the treatment of one of the sheets of each pair, before the bending of the pair of sheets about transverse axes on opposite sides of the central portion of each sheet, in order to minimize the introduction of glass chips between the sheets during the bending operation so that the yield of windshields after the elevated pressure bonding treatment is improved.

These and other objects of the present invention will be apparent to one skilled in the art from the following disclosure of the method of the present invention when taken in conjunction with the drawing in which.

I have discovered that the creation of glass chips and their introduction between the glass sheets of a doublet being bent can be substantially minimized and even completely avoided by seaming one face at the tip only of the end portion of the smaller glass sheet of the doublet. When the glass sheets of the doublets are to be bent about transverse axes between the central portion and the end portions, the method includes the seaming at the tone face at the tip only of both end portions of the smaller glass sheet. Although it is not necessary, the other face of the smaller glass sheet can be seamed at the tips only of the end portions; however, it is not necessary to seam both faces at the tips only of the end portions of the smaller glass sheet.

Figure 1:
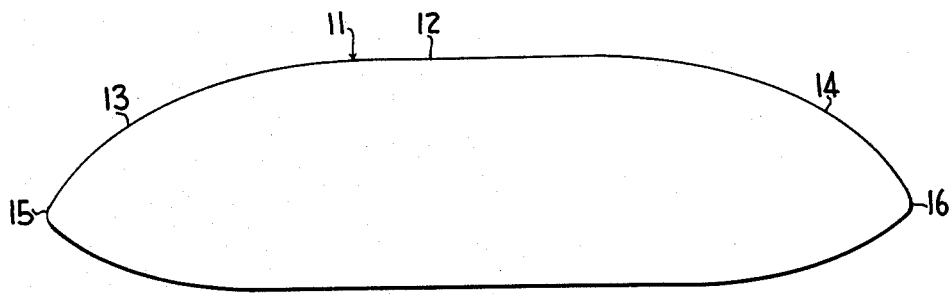
FIG. 1 is a plan of a sheet of flat glass cut to outline.
Figure 2:
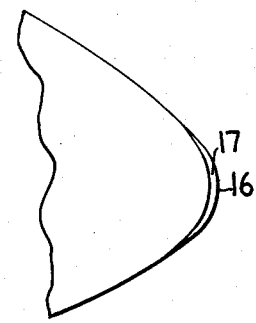
FIG. 2 is a fragmentary plan of the sheet of FIG. 3 after seaming at the tip only of the end portion of the sheet such as shown in FIG. 1.
Figure 3:
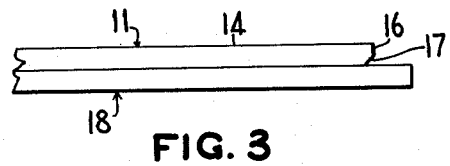
FIG. 3 is a fragmentary elevation of a doublet of flat glass sheets with the sheet of FIG. 2 resting on a longer glass sheet also cut to pattern to provide a doublet for bending.

FIG. 1 shows an illustrative outline of the smaller glass sheet generally indicated at 11. The sheet 11 is elongated and has a central portion 12 and end portions 13 and 14. The sheet 11 has somewhat pointed end portions 13 and 14, i.e., the portions 13 and 14 at the longitudinal extremities of sheet 11 have generally outwardly converging edges to form tips 13 and 14, respectively, narrower than central portion 12. In accordance with the present invention, one face of sheet 11 at its tips 15 and 16 is seamed to provide seamed surfaces. For tip 16 the seamed surface portion 17, which is obtained, is shown in FIG. 2. A similar seamed surface portion is provided on the same face of sheet 11 at tip 15.

The glass sheet 11 of FIG. 2 is inverted and placed on a larger glass sheet, generally indicated at 18, which is also cut to outline generally indicated for sheet 11 in FIG. 1. The sheet 18 at its longitudinal extremities extends beyond sheet 11, i.e., sheet 18 is longer in a longitudinal direction than sheet 11. Because sheet 11 is inverted, the seamed surface portion 17 faces the top surface of sheet 18. The doublet shown in FIG. 1 is placed on a bending mold. When the mold is passed through a bending lehr the flat sheets 11 and 18 are bent. As the bending occurs there is some sliding contact between sheets 11 and 18 at their end portions. There is a change in the relative position of the extremities of sheets 11 and 18 during the bending operation. As a result, the end portions 13 and 14 of sheet 11 slide along sheet 18 but because of the seamed surface portions, such as seamed portion 17, of tips 15 and 16 of sheet 11, the bending of the doublet does not result in glass chips at positions between the sheets in the central portion or the end portions of the sheets.

Figure 5:
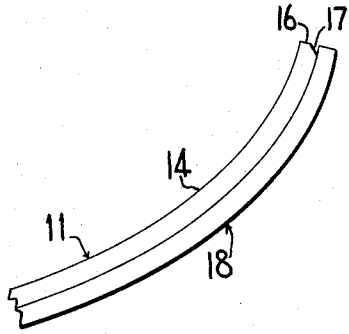
FIG. 5 is a fragmentary elevation showing the doublet after the completion of the bending operation.
Figure 4:
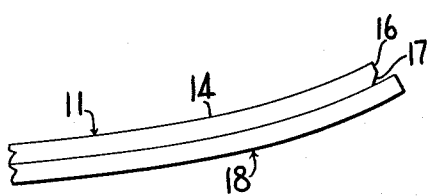
FIG. 4 is a fragmentary elevation showing the doublet of FIG. 3 as it would appear during but prior to the completion of the bending operation.

After the doublet has been bent on the mold to produce the curved doublet shown in part in FIG. 5, glass sheets 11 and 18 are separated to place a sheet of plasticized thermoplastic material between them. The air is removed from between the plastic sheet and the glass sheets of the composite assembly. While maintaining a vacuum at the periphery of the composite assembly the assembly is heated to provide a bonding of the plastic sheet to the glass sheets at least at the margin of the assembly. Then the composite assembly at an elevated temperature is subjected to an elevated pressure to complete the bonding of the glass sheets to the thermoplastic sheet. The conditions of elevated temperature and pressure are described in the Keim patent mentioned above.

By carrying out the method described above, including the seaming of the tips of the smaller glass sheet at one face and the placing of the smaller glass sheet of the doublet in contact with the larger glass sheet for bending so that the seamed portion of the tips face the larger glass sheet, an improved product from the optical standpoint is obtained and an improved yield of windshields in the elevated pressure treatment for bonding is also obtained.

The width of the seamed portion at the tips 15 and 16 of the smaller glass sheet of the doublet can be as small as about a couple of inches as measured around the tip with the seam extending inwardly, e.g., about 1/32 inch. The face of the smaller glass sheets at tips 15 and 16 can be seamed in any conventional manner for seaming, but it is preferred that the seamed surface portions, such as seamed portion 17, of tips 15 and 16 be produced by the method and apparatus disclosed and claimed in a patent application being filed this same date by Lyle L. Shumaker. That application has been reviewed by me prior to the execution of both patent applications. Of course, other methods of seaming the tips of the smaller glass sheet are suitable. For example, one tip of the smaller glass sheet can be moved manually into contact with a moving abrasive belt to seam that tip and then the other tip moved manually against the belt to provide the seamed surface portions described above.

The seamed portions of the tips of the smaller glass sheet 11 are provided on the same face of the glass sheet. This face is preferably the "break out" side of the sheet. To cut the glass sheet to an outline as shown in FIG. 1 a larger glass sheet is scored on one face or major surface along a continuous line having the outline shown in FIG. 1. Then the cut is run along the score line to produce sheet 11. The sheet's other face or major surface is customarily referred to as the "break out" side.

The foregoing description of the present invention has been presented for purpose of illustration only. The invention is limited only by the claims which follow.

I claim:

1. In the method of making a laminated curved assembly comprising two glass sheets bonded to a plastic interlayer and having for each of said glass sheets a central portion and end portions extending in the same direction from the central portion with a small radius of curvature between the central portion and the end portions which comprises bending together a smaller glass sheet and a larger glass sheet both cut to outline, placing thermoplastic material between the bent glass sheets and bonding at an elevated temperature the glass sheets to the thermoplastic material by the application of an elevated pressure, the improvement comprising seaming one face only of said smaller sheet at the tips of the end portions of the smaller glass sheet to provide seamed surface portions of said face at the tips of said smaller sheet and placing said smaller glass sheet against the larger glass sheet with said seamed surface portions facing said larger glass sheet prior to said bending.

2. In the method of making a laminated curved assembly comprising two glass sheets bonded to a plastic interlayer and having for each of said glass sheets a main portion and an end portion extending from the main portion with a small radius of curvature between the main portion and the end portion which comprises bending together a smaller glass sheet and a larger glass sheet both cut to outline, placing thermoplastic material between the bent glass sheets and bonding the glass sheets to the thermoplastic material at an elevated temperature by the application of an elevated pressure, the improvement comprising seaming one face only of said smaller sheet at the tip of the end portion of the smaller glass sheet to provide a seamed surface portion of said face at the tip of said smaller sheet and placing said smaller glass sheet against the larger glass sheet with said seamed surface portion facing said larger glass sheet prior to said bending.

3. A method of preparing a pair of glass sheets, comprising a longer glass sheet and a shorter glass sheet, for simultaneously bending into a desired shape prior to forming a laminated assembly of said bent glass sheets comprising seaming one face only of said shorter glass sheet at the tip of an end portion thereof, mounting the longer glass sheet on a suitable shaping surface so that one surface of said longer glass sheet faces upward, and superimposing the shorter glass sheet on the longer glass sheet with said seamed face of said end portion in facing relation to said upward facing surface of said longer glass sheet.

4. A method of preparing a pair of glass sheets, comprising a longer glass sheet and a shorter glass sheet, for simultaneously bending the end portions of said sheets in the same direction from the central portion thereof prior to forming a laminated assembly of said bent glass sheets comprising seaming one face only of said shorter glass sheet at its end portions, mounting the longer glass sheet on a suitable shaping surface so that one surface of said longer glass sheet faces upward, and superimposing the shorter glass sheet on the longer glass sheet with said seamed face in facing relation to said upwardly facing surface of said longer glass sheet.

References Cited in the file of this patent

UNITED STATES PATENTS

| | | |
|---|---|---|
| 1,613,276 | Hall | Jan. 4, 1927 |
| 1,906,392 | McLeod | May 2, 1933 |
| 1,992,976 | Watkins | Mar. 5, 1935 |